US012686143B2

(12) United States Patent
Ben Ghorbal et al.

(10) Patent No.: US 12,686,143 B2
(45) Date of Patent: Jul. 21, 2026

(54) MODULAR COMB ELEMENT FOR A MACHINE FOR AUTOMATIC CUTTING OF A MAT OF SHEETS OF MATERIAL

(71) Applicants: LECTRA, Paris (FR); AMVALOR, Paris (FR); ECOLE NATIONALE SUPERIEURE D'ARTS ET METIERS (ENSAM), Paris (FR); CENTRE NATIONAL DE LA RECHERCHE SCIENTIFIQUE, Paris (FR); CONSERVATOIRE NATIONAL DES ARTS ET METIERS, Paris (FR)

(72) Inventors: Ghailen Ben Ghorbal, Talence (FR); Didier Chabirand, Cestas (FR); Régis Lallement, Cestas (FR); Gilles Regnier, L'Hay-les-Roses (FR)

(73) Assignees: LECTRA, Paris (FR); AMVALOR, Paris (FR); ECOLE NATIONALE SUPERIEURE D'ARTS ET METIERS (ENSAM), Paris (FR); CENTRE NATIONAL DE LA RECHERCHE SCIENTIFIQUE, Paris (FR); CONSERVATOIRE NATIONAL DES ARTS ET METIERS, Paris (FR)

( * ) Notice: Subject to any disclaimer, the term of this patent is extended or adjusted under 35 U.S.C. 154(b) by 188 days.

(21) Appl. No.: 18/261,044

(22) PCT Filed: Jan. 12, 2022

(86) PCT No.: PCT/FR2022/050063
§ 371 (c)(1),
(2) Date: Jul. 11, 2023

(87) PCT Pub. No.: WO2022/153006
PCT Pub. Date: Jul. 21, 2022

(65) Prior Publication Data

US 2024/0058980 A1 Feb. 22, 2024

(30) Foreign Application Priority Data

Jan. 18, 2021 (FR) ...................................... 2100452

(51) Int. Cl.
*B26D 7/20* (2006.01)
*B26D 7/01* (2006.01)
*B26D 7/06* (2006.01)
*B26D 7/32* (2006.01)

(52) U.S. Cl.
CPC ............... *B26D 7/20* (2013.01); *B26D 7/018* (2013.01); *B26D 7/0675* (2013.01); *B26D 7/32* (2013.01); *B26D 2007/322* (2013.01)

(58) Field of Classification Search
CPC ........ B26D 7/20; B26D 7/018; B26D 7/0675; B26D 7/32; B26D 2007/322;
(Continued)

(56) References Cited

U.S. PATENT DOCUMENTS 3,941,238 A * 3/1976 Lapeyre ................ B65G 15/46
198/635
4,434,691 A 3/1984 Leblond
(Continued)

FOREIGN PATENT DOCUMENTS

EP 0542410 A2 5/1993
FR 3108547 A1 10/2021
(Continued)

OTHER PUBLICATIONS

French Search Report from corresponding French Patent Application No. FR2100452, Sep. 29, 2021.
(Continued)

*Primary Examiner* — Ghassem Alie
(74) *Attorney, Agent, or Firm* — Workman Nydegger

(57) ABSTRACT

A modular comb element for a machine for automatically cutting a mat of sheets of material. The cutting machine includes a plurality of cutting supports. The comb element includes a plate forming a support from which a first and a second row of teeth extend longitudinally. The teeth of the first row alternate with the teeth of the second row, and a free
(Continued)

end of the teeth of the first row are farther from a downstream edge of the support than a free end of the teeth of the second row of teeth. A ramp is mounted on the downstream edge of the support and inclined with respect to the latter so as to limit the contact surface between the mat of sheets and the comb element. Air injection means are at a downstream edge of the ramp over an entire width thereof.

14 Claims, 5 Drawing Sheets

(58) Field of Classification Search
CPC .. B26D 2007/1809; B26D 5/005; B26D 3/28; B26D 7/18; B26F 1/382; B26F 1/3813; B26F 1/38; B26F 3/004; B65G 47/66; B65G 49/66; Y10T 83/0448; Y10T 83/2194; Y10T 83/0605; Y10T 83/748; Y10T 83/2185
USPC ....... 83/56, 152, 422, 451, 39, 71, 216, 217, 83/263, 49, 940, 635, 155.1, 23; 198/635, 699.1, 689.1
See application file for complete search history.

(56) References Cited

U.S. PATENT DOCUMENTS 4,492,241 A 1/1985 Thaler et al.
4,572,357 A * 2/1986 Pearl .................... B26D 7/0675 271/275
5,228,554 A * 7/1993 Kuchta ................ B26D 7/0675 83/155.1
5,358,226 A * 10/1994 Arikita ...................... B26F 1/00 269/21
2006/0053991 A1* 3/2006 Arikita ..................... B26D 7/20 83/168
2013/0291593 A1* 11/2013 Roh ...................... C03B 33/037 65/158
2015/0158673 A1* 6/2015 Lenser ................... B65G 23/06 198/689.1
2020/0156280 A1* 5/2020 Balsells Mercadé ........................ B26D 7/1818
2023/0114746 A1 4/2023 Chabirand et al.

FOREIGN PATENT DOCUMENTS

JP S58203710 A 11/1983
JP 2010158758 A 7/2010
JP 2020127986 A 8/2020
WO WO-2021260320 A1 * 12/2021 ............. B26D 7/018

OTHER PUBLICATIONS

International Search Report from corresponding PCT Application No. PCT/FR2022/050063, Apr. 13, 2022.
Japanese Office Action from Corresponding Japanese Patent Application No. JP2023-542880, May 14, 2025.

* cited by examiner

MODULAR COMB ELEMENT FOR A MACHINE FOR AUTOMATIC CUTTING OF A MAT OF SHEETS OF MATERIAL

TECHNICAL FIELD

The invention relates to the general field of machines for automatically cutting a mat of sheets of material, in particular textile materials, using a vibrating blade penetrating into a suction cutting support driven by a conveyor. It relates more specifically to the loading and unloading combs equipping such cutting machines.

PRIOR ART

Typically, a vibrating-blade cutting machine comprises a cutting conveyor which is used to drive the mat of sheets to be cut during the cutting operation. This cutting conveyor is housed in a box inside which a high vacuum is established in order to keep the sheets of material to be cut immobile during the cutting operation.

In this type of machine, the cutting conveyor also serves as a penetrating cutting support for the vibrating blade. It is indeed known to make the cutting support penetrable by the blade so that during the cutting operation, the blade can not only completely pass through the material to be cut, but also extend downwards beyond the support surface and in the bed of material providing such a surface.

To this end, the cutting support generally consists of an assembly of blocks driven by a belt of the conveyor, each block comprising a plurality of bristles mounted on a sole in several parallel rows. Transversal channels are made through the sole to allow the passage of the suction air. These blocks thus make it possible to support the mat of sheets of material to be cut while being able to be penetrated by the cutting blade.

The vibrating-blade cutting machines are also equipped with loading and unloading combs which are located at each end of the conveyor. The loading combs have the function of assisting in the transfer of the mat of sheets of material to be cut from an upstream spreading table on the upstream end of the conveyor of the cutting machine. Similarly, the unloading combs have the function of assisting in the transfer of the cut mat from the downstream end of the conveyor of the cutting machine to an unloading conveyor located downstream.

The unloading combs therefore constitute the transition between the area where the mat is kept under vacuum (that is to say on the suction cutting support) and the area without vacuum (that is to say on the unloading conveyor). Also, these unloading combs must ensure continuity in maintaining the mat while minimizing the surfaces of the bristles of the cutting supports that are not in contact with the mat.

The unloading combs generally comprise several inclined and parallel protrusions that penetrate through the bristles of the cutting supports so as to form a ramp that guides the cut mat out of the cutting surface towards the unloading conveyor. These protrusions are disposed parallel to each other and span the entire width of the cutting surface at the downstream end of the conveyor. For example, reference may be made to document US 2020/0156280 which describes an exemplary embodiment of an unloading comb with two rows of protrusions of different lengths of penetration through the bristles of the cutting supports.

The unloading combs known from the prior art have certain drawbacks. Particularly, during the mat cutting operations, the bristles of the cutting supports can undergo deformations that make their distribution heterogeneous. However, the unloading combs known from the prior art do not make it possible to rearrange the support bristles which pass through the combs.

DISCLOSURE OF THE INVENTION

The main purpose of the present invention is therefore to propose a comb that does not have the aforementioned drawbacks.

This purpose is achieved by means of a modular comb element for a machine for automatically cutting a mat of sheets of material, the cutting machine comprising a plurality of cutting supports mounted on a conveyor and each comprising a plurality of bristles on which the mat of sheets of material to be cut is intended to rest, the comb element comprising a plate forming a support from which a first and a second row of teeth extend longitudinally, the teeth of the first row alternating with the teeth of the second row, and a free end of the teeth of the first row being farther from a downstream edge of the support than a free end of the teeth of the second row of teeth, and further comprising, in accordance the invention, a ramp mounted on the downstream edge of the support and inclined with respect to the latter so as to limit the contact surface between the mat of sheets and the comb, and air injection means at a downstream edge of the ramp over an entire width thereof in order to facilitate the unloading/loading of the mat of sheets.

The comb according to the invention is remarkable in particular in that it provides a ramp which is mounted on the downstream edge of the support and which is inclined with respect to the latter. This ramp, and the air injection means associated therewith, makes it possible to limit the contact surface between the mat of sheets (to be unloaded or loaded) and the comb in order to facilitate the transition between the portion of the mat that is subjected to suction and the one which is not. The unloading (or loading) the mat of sheets of material is greatly facilitated.

The comb according to the invention is also remarkable in that it consists of a plurality of independent modular elements which are assembled on the same plate to ensure the continuity between the cutting conveyor and the unloading conveyor (for the unloading comb) and between the spreading table and the cutting conveyor (for the loading comb). The combs being highly stressed parts, making them modular allows to be able to change only the elements that could have been damaged.

The comb according to the invention is further remarkable in that it provides two rows of teeth. The teeth of the first row make it possible to straighten the bristles of the cutting supports of the machine that would have suffered a deformation to the point of no longer being perpendicular to the mat of sheets of material. As for the teeth of the second row, they make it possible to tighten the heads of the bristles of the cutting supports in order to limit the free space therebetween.

The air injection means can comprise at least one downstream row of air injection orifices emerging at the downstream edge of the ramp between two adjacent teeth and opening in an air supply channel which extends over the entire width of the support.

In this case, the air injection means can further comprise a second downstream row of air injection orifices emerging at the downstream edge of the ramp between two adjacent teeth and opening in the air supply channel.

Similarly, the air injection means can further comprise an upstream row of air injection orifices emerging at an upstream edge of the ramp and opening in the air supply channel.

The air supply channel can be in communication with surrounding air or in communication with a pressurized air circuit.

Preferably, the comb element further comprises a third row of teeth which is independent of the first and second rows of teeth and which is mounted under the support longitudinally recessed from the first and second rows of teeth. The teeth of this third row ensure a repositioning of the bristles of the cutting supports which would have been potentially deformed during their passages through the two other rows of teeth.

In this case, the teeth of the third row of teeth can extend longitudinally from an upstream edge of the support opposite to the downstream edge. Similarly, a free end of the teeth of the third row of teeth can be longitudinally recessed from the downstream edge of the support.

Also in this case, the teeth of the third row of teeth are preferably laterally offset from the teeth of the first row of teeth and from the teeth of the second row of teeth.

Preferably, the free end of the teeth of the first row of teeth has a bulbous shape. This bulbous shape ensures the guiding of the shaft of the bristles of the cutting supports before their respective head are fully engaged through the comb element.

Also preferably, the lateral distance separating two adjacent teeth of the first row of teeth corresponds substantially to the lateral bulk of an even number of adjacent bristles of the cutting supports, and the lateral distance separating two adjacent teeth of the first and second rows of teeth substantially corresponds to half the lateral distance separating two adjacent teeth of the first row of teeth. These distances ensure a tightening of the heads of the bristles therebetween.

The invention also relates to a machine for automatically cutting a mat of sheets of material, comprising a plurality of cutting supports which are mounted on a conveyor and which each comprise a plurality of bristles on which the mat of sheets of material to be cut is intended to rest, the machine further comprising at least at one of its ends a comb consisting of a plurality of comb elements as defined previously.

The end can be an unloading end and/or a loading end (in which case the comb is an unloading comb and/or an unloading comb, respectively).

Some comb elements may have different characteristics from other comb elements. By "characteristics", it is meant in particular the number of teeth of the two rows, their lengths, their shapes, their positions, etc.

DESCRIPTION OF THE EMBODIMENTS

In a vibrating-blade cutting machine, the mat of sheets of material to be cut is driven by a cutting conveyor during the cutting operation. The upper portion of the cutting conveyor serves as a cutting support and the lower portion is generally housed in a box inside which a high vacuum is established in order to keep the material to be cut immobile during the cutting operation.

Figure 1:
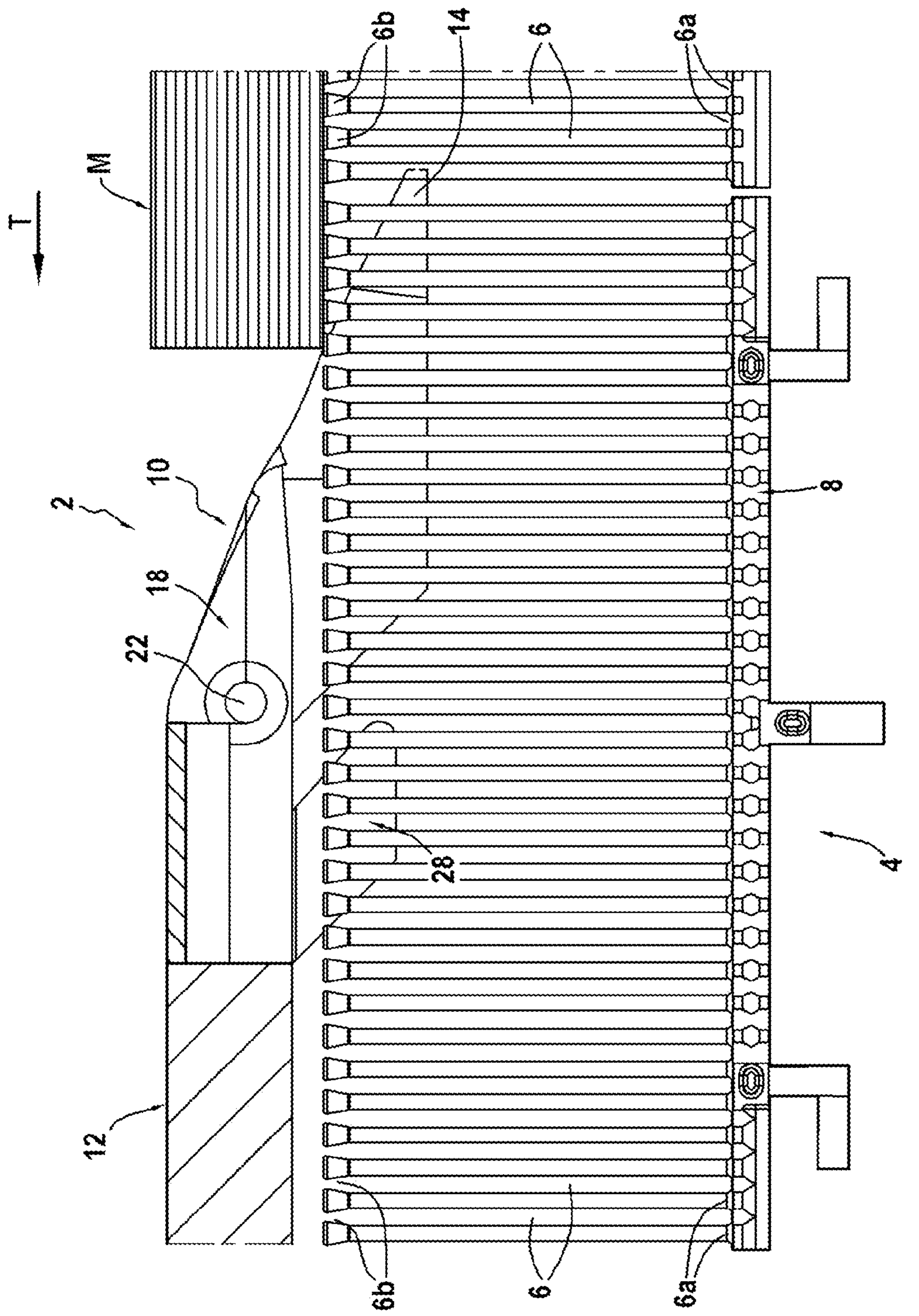
FIG. 1 is a partial side view showing the unloading end of a cutting machine provided with an unloading comb according to the invention.

FIG. 1 partially represents the downstream end (called unloading end) of such a cutting machine 2. As represented in this figure, the cutting support 4 consists of an assembly of a plurality of blocks which are mounted on a belt for driving the cutting conveyor (not represented).

In known manner, each block of the cutting support includes a plurality of bristles 6 which are aligned in parallel rows. Each bristle 6 has a foot 6*a* mounted on a sole 8 and a head 8*b* which is opposite to the foot and which is intended to serve as a support for the mat M of sheets of material to be cut.

As described in patent application FR 20 03043 filed on 27 Mar. 2020, the blocks of the cutting support can be formed by the assembly of a plurality of modular elements, each modular element comprising bristles arranged in the same and unique row of bristles.

Furthermore, at the level of the downstream end of the cutting surface (with respect to the direction of advance T of the cutting conveyor), the cutting machine comprises an unloading comb which is typically raised with respect to the cutting surface and which extends over the entire width thereof.

The main function of the unloading comb is to assist in the transfer of the mat M to be unloaded from the downstream end of the cutting conveyor to an unloading conveyor (not represented).

According to the invention, the unloading comb is modular, that is to say it is composed of a plurality of modular comb elements 10 which are placed end to end to form the comb.

Still according to the invention, as represented in FIGS. 2 to 5, each comb element 10 comprises a substantially horizontal plate 12 forming a support from which a first row of teeth 14 and a second row of teeth 16 extend longitudinally, the teeth of the first row alternating with the teeth of the second row.

Furthermore, a free end of the teeth 14 of the first row is farther from a downstream edge of the support than a free end of the teeth 16 of the second row of teeth. In other words, the teeth 14 of the first row protrude with respect to the teeth 16 of the second row.

The teeth 14, 16 of these two rows of teeth have a substantially triangular shape with a respective upper ridge 14*a*, 16*a* which is inclined downwards relative to the substantially horizontal support 12 of the comb element.

Preferably, the inclination of the upper ridge 16*a* of the teeth 16 of the second row is greater than that of the upper ridge 14*a* of the teeth 14 of the first row.

Figure 3:
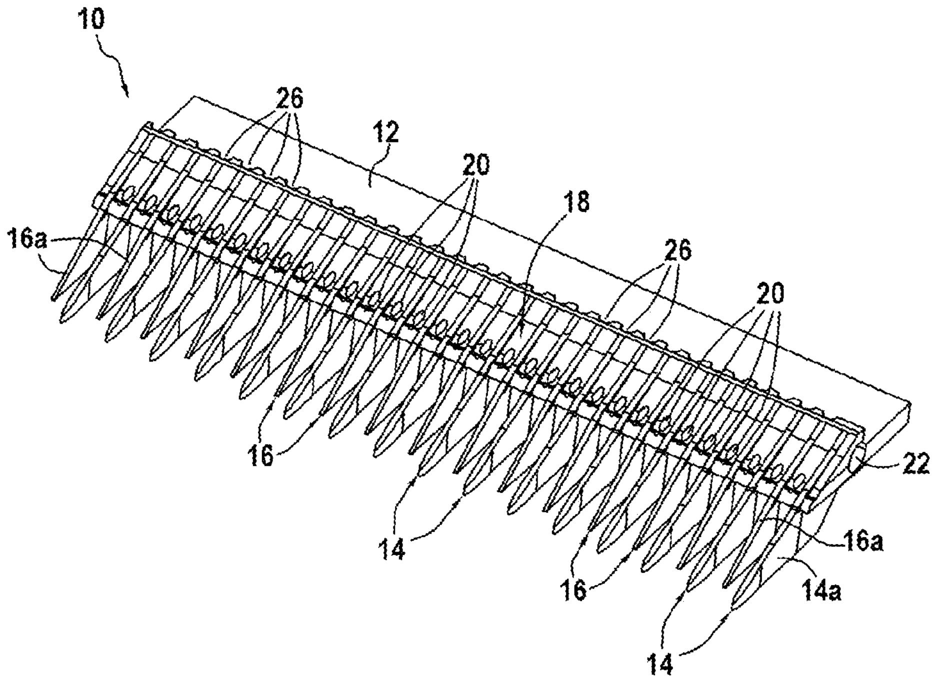
FIG. 3 is a perspective view of a comb element according to one variant of embodiment of the invention.
Figure 4:
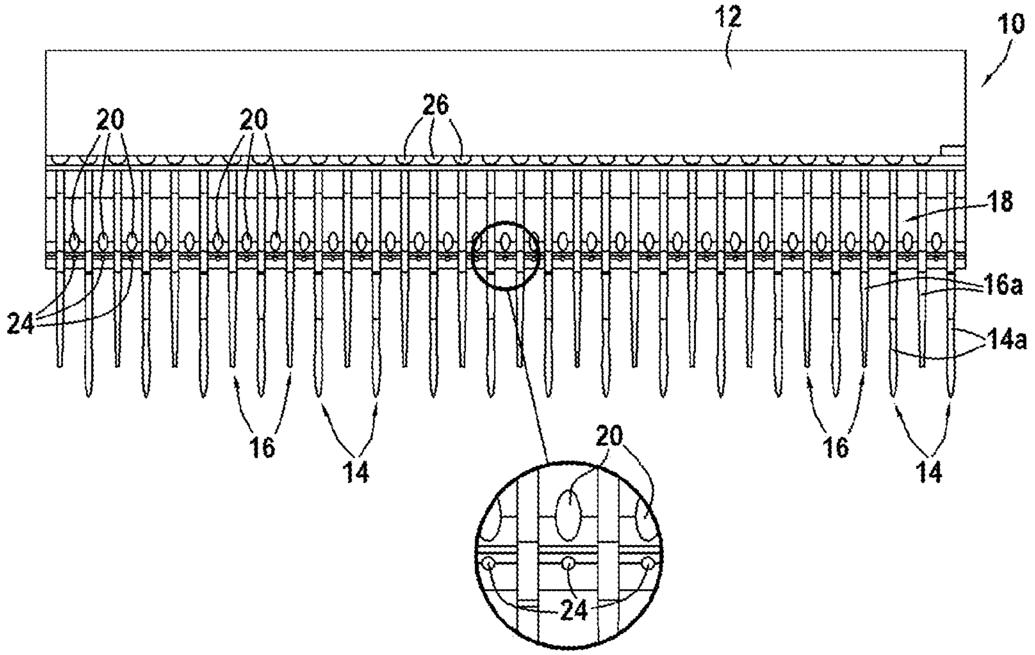
FIG. 4 is a top view of the comb element of FIG. 3.

Also preferably, the free end of the teeth 14 of the first row of teeth has a bulb shape, that is to say a rounded bulge shape as can be seen in particular in FIGS. 3 and 4.

This particular bulb shape ensures the guiding of the shaft of the bristles 6 of the cutting supports before their head 6*b* is fully engaged through the unloading comb. When the shaft of the bristles is of smaller section than that of the head, the bulb-shaped free end of the teeth 14 is located below the entire head so as not to interfere with the shaft of the bristles.

Still according to the invention, a ramp 18 is mounted on the downstream edge of the support 12 of each comb element 10.

Figure 6:
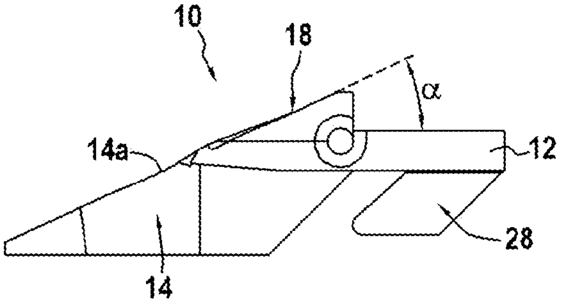
FIG. 6 is a side view of the comb element of FIG. 3.

More specifically, this ramp 18 extends in the upstream continuity of the teeth 14, 16 and is inclined downwards with respect to the support 12 which is substantially horizontal. As represented in FIG. 6, the ramp 18 thus has an angle of inclination a relative to the support 12 which is comprised between 0 and 45° and which is substantially equal to the angle of inclination formed by the respective upper ridges 14*a* of the teeth 14 of the first row.

The ramp 18 thus arranged makes it possible to limit the contact surface between the mat M to be unloaded and the comb element 10.

Each comb element 10 according to the invention further comprises air injection means at a downstream edge of the ramp 18 over an entire width thereof in order to facilitate the unloading of the mat M.

As illustrated in particular in FIGS. 2 to 4 and 7, these air injection means comprise at least one downstream row of air injection orifices 20 which emerge at the downstream edge of the ramp 18 between two adjacent teeth 14, 16 and which open in an air supply channel 22 which extends over the entire width of the support.

Preferably, the air injection means further comprise a second downstream row of air injection orifices 24 which also emerge at the downstream edge of the ramp 18 between two adjacent teeth 14, 16 and which open in the same air supply channel 22.

Figure 7:
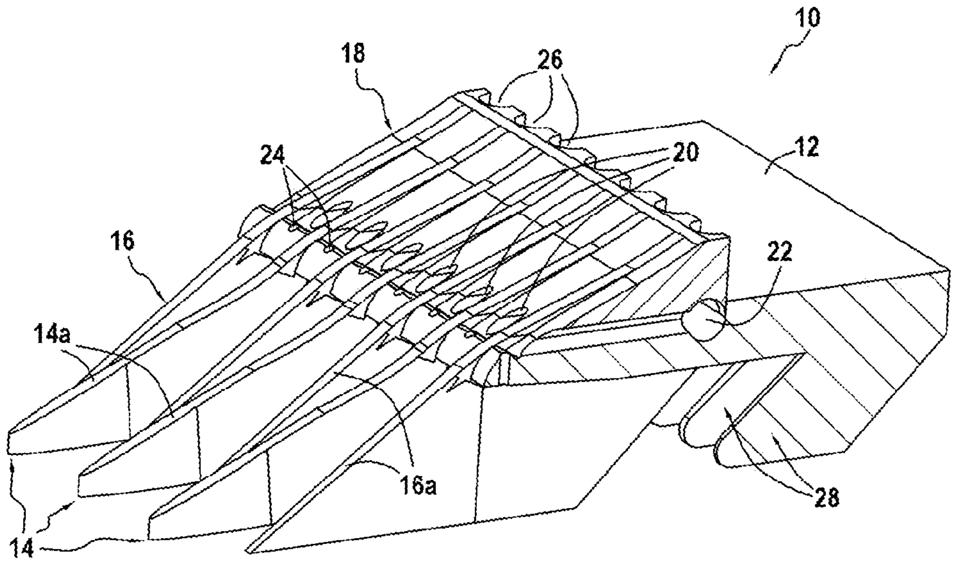
FIG. 7 is a cross-sectional view of the comb element of FIG. 3.

In FIGS. 4 and 7 in which these air injection orifices of the second row are in particular visible, it can be seen that these orifices 24 are each aligned with an orifice 20 of the first downstream row, by being disposed below these orifices.

Also preferably, the air injection means further comprise an upstream row of air injection orifices 26 which emerge at an upstream edge of the ramp 18 and which open in the air supply channel 22.

As represented more specifically in FIGS. 3 and 4, these orifices 26 of the upstream row are positioned at a longitudinal end of the ramp 18 opposite to the one where the orifices 20, 24 of the downstream rows are positioned.

In addition, the orifices 26 of the upstream row emerge along a substantially vertical direction, while the orifices 20, 24 of the downstream rows emerge along substantially horizontal directions.

The air supply channel 22 which is common to all the air injection orifices 20, 24 and 26 can be supplied with surrounding air or be in communication with a pressurized air circuit (not represented).

All of the air injection orifices 20, 24 and 26 make it possible to put the area of the ramp 18 at atmospheric pressure or in slight overpressure (depending on the supply of the channel 22) in order to limit the portion of the mat to be unloaded that is subjected to vacuum due to suction in the cutting conveyor. The transfer of the mat M from the cutting conveyor to the unloading conveyor is greatly facilitated.

According to one advantageous arrangement of the invention, the comb element 10 further comprises a third row of teeth 28 which is independent of the first and second rows of teeth 14, 16 and which is mounted under the support 12 longitudinally recessed from the first and second rows of teeth.

As represented in FIG. 6, the teeth 28 of this third row of teeth extend longitudinally from an upstream edge of the support 12 which is opposite to the downstream edge.

In addition, the free end of the teeth 28 of the third row of teeth can be longitudinally recessed from the downstream edge of this support 12.

Figure 5:
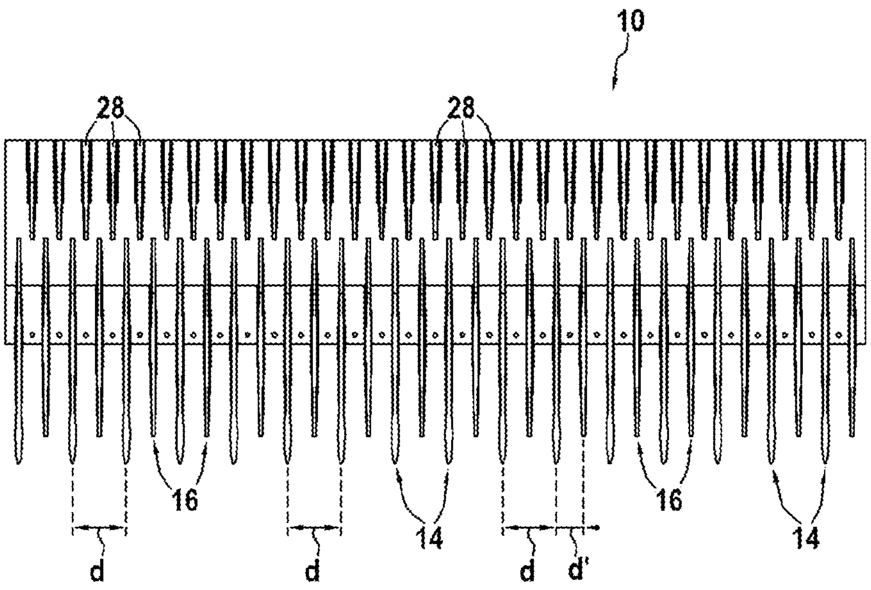
FIG. 5 is a bottom view of the comb element of FIG. 3.

Furthermore, as represented in FIG. 5, the teeth 28 of the third row of teeth are preferably laterally offset from the teeth 14 of the first row of teeth and from the teeth 16 of the second row of teeth.

In other words, the teeth 28 of the third row are laterally inserted between two adjacent teeth 14, 16 belonging to the first and second rows.

The teeth 28 of this third row of teeth have the function of ensuring a repositioning of the bristles 6 of the cutting supports 4 that would have been potentially deformed during their passages through the other two rows of teeth 14, 16.

According to another advantageous arrangement, the lateral distance d separating two adjacent teeth 14 from the first row of teeth (see FIGS. 2 and 5) substantially corresponds to the lateral bulk of an even number of adjacent bristles 6 of the cutting supports 4.

Figure 2:
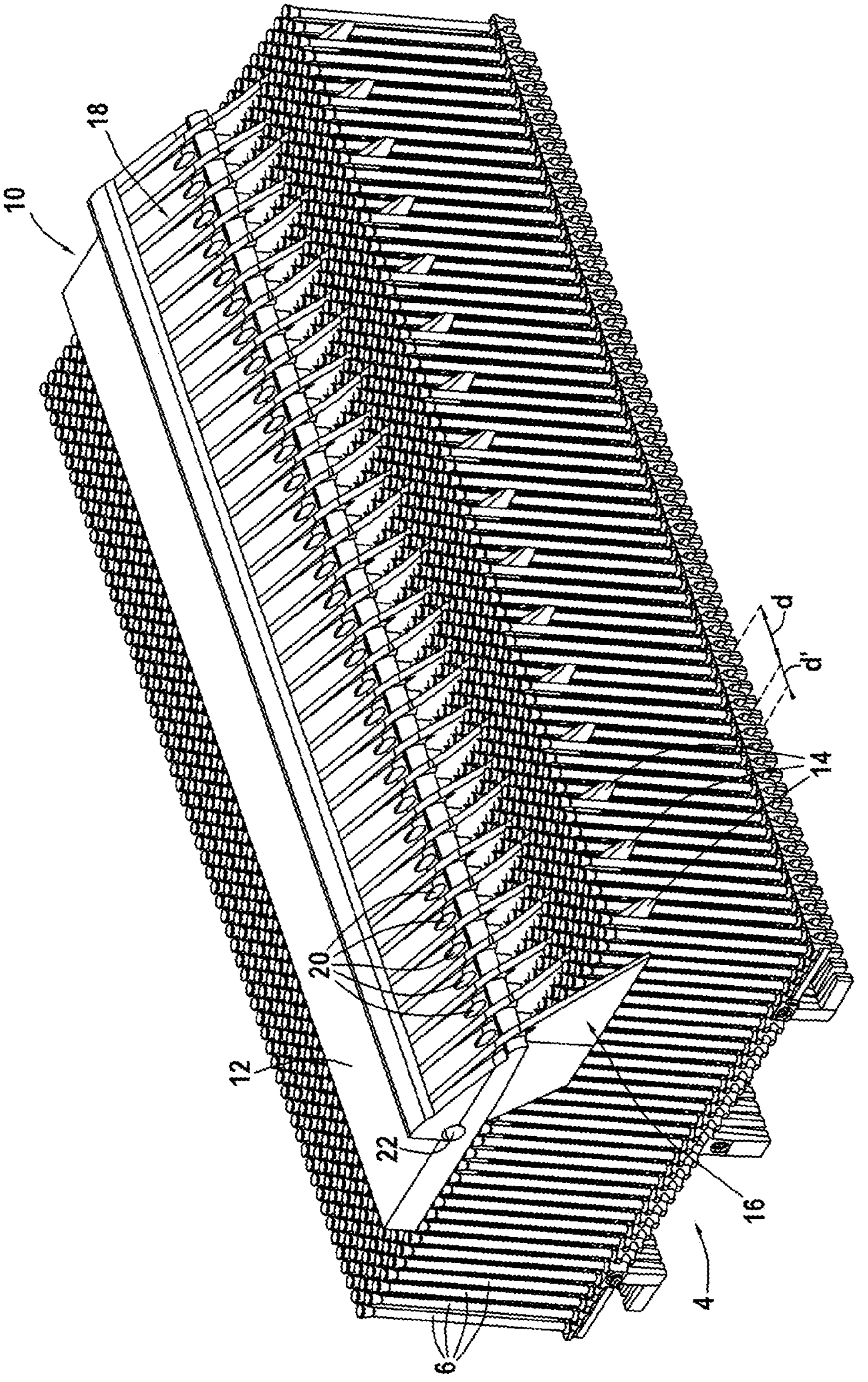
FIG. 2 is a perspective view of an unloading comb element of FIG. 1.

In the exemplary embodiment of FIG. 2, this lateral distance between two adjacent teeth 14 corresponds to the lateral bulk of four bristles 6 of the cutting support 4.

Similarly, the lateral distance d' separating two adjacent teeth 14, 16 of the first and second rows of teeth (see FIGS. 2 and 5) substantially corresponds to half the lateral distance d' separating two adjacent teeth 14 from the first row of teeth.

Thus, still on the exemplary embodiment of FIG. 2, this lateral distance d' corresponds to the lateral bulk of two bristles 6 of the cutting support.

As indicated above, the unloading comb is modular, that is to say it is composed of a plurality of modular comb elements as described above which are placed end to end.

This modularity has in particular the advantage that some comb elements of the unloading comb can have different characteristics from the other comb elements depending on the specific features of the underlying cutting supports.

By "characteristics" of the comb elements, it is meant the number of teeth of the two or three rows of teeth, the length of the teeth, the shape of the teeth, the lateral spacing between two teeth, etc.

Furthermore, similarly to what has just been described for the unloading comb, the cutting machine comprises, at the level of the opposite longitudinal end of the cutting surface, a loading comb (not represented in the figures) which is generally raised with respect to the cutting surface and which makes it possible to assist in the loading of the mat of sheets of material from the spreading table to the cutting surface.

The invention also applies to this loading comb: the latter is advantageously modular and each comb element has the same characteristics as those which have been described in relation to the unloading comb.

The invention claimed is:

1. A modular comb element for a machine for automatically cutting a mat of sheets of material, the cutting machine including a plurality of cutting supports mounted on a conveyor and each cutting support of the plurality of cutting supports including a plurality of bristles on which the mat of sheets of material is intended to rest, the modular comb element comprising:

- a plate forming a support from which a first and a second row of teeth extend longitudinally, the teeth of the first row alternating with the teeth of the second row, and a free end of the teeth of the first row being farther from a downstream edge of the support than a free end of the teeth of the second row of teeth,
- a ramp mounted on the downstream edge of the support and inclined with respect to the support so as to limit contact surface between the mat of sheets of material and the modular comb element, and
- air injection means including air injection orifices at a downstream edge of the ramp over an entire width thereof in order to facilitate unloading and loading of the mat of sheets of material, wherein the air injection orifices are adjacent to the first and second rows of teeth and configured to limit a portion of the mat to be unloaded that is subjected to vacuum from suction in the conveyor.

2. The element according to claim 1, wherein the air injection means comprise at least one downstream row of air injection orifices emerging at the downstream edge of the ramp between two adjacent teeth of the first and second rows of teeth and opening in an air supply channel which extends over the entire width of the support.

3. The element according to claim 2, wherein the air injection means further comprise a second downstream row of air injection orifices emerging at the downstream edge of the ramp between two adjacent teeth of the first and second rows of teeth and opening in the air supply channel.

4. The element according to claim 2, wherein the air injection means further comprise an upstream row of air injection orifices at an upstream edge of the ramp and opening in the air supply channel.

5. The element according to claim 2, wherein the air supply channel is in communication with surrounding air or in communication with a pressurized air circuit.

6. The element according to claim 1, further comprising a third row of teeth which is independent of the first and second rows of teeth and which is mounted under the support and longitudinally recessed from the first and second rows of teeth.

7. The element of claim 6, wherein the teeth of the third row of teeth extend longitudinally from an upstream edge of the support opposite to the downstream edge of the support.

8. The element according to claim 6, wherein a free end of the teeth of the third row of teeth is longitudinally recessed from the downstream edge of the support.

9. The element according to claim 6, wherein the teeth of the third row of teeth are laterally offset from the teeth of the first row of teeth and from the teeth of the second row of teeth.

10. The element according to claim 1, wherein the free end of the teeth of the first row of teeth has a bulbous shape.

11. The element according to claim 1, wherein a lateral distance separating two adjacent teeth of the first row of teeth corresponds substantially to a lateral bulk of an even number of adjacent bristles of the cutting supports, and the lateral distance separating two adjacent teeth of the first and second rows of teeth substantially corresponds to half of a lateral distance separating two adjacent teeth of the first row of teeth.

12. A machine for automatically cutting a mat of sheets of material, said machine comprising:

a plurality of cutting supports which are mounted on a conveyor and which each comprise a plurality of bristles on which the mat of sheets of material to be cut is intended to rest, the machine further comprising, at least at one end of the machine, a comb comprising a plurality of comb elements, each comb element comprising:

a plate forming a support from which a first and a second row of teeth extend longitudinally, the teeth of the first row alternating with the teeth of the second row, and a free end of the teeth of the first row being farther from a downstream edge of the support than a free end of the teeth of the second row of teeth, a ramp mounted on the downstream edge of the support and inclined with respect to the support so as to limit contact surface between the mat of sheets of material and the comb element, and air injection means including air injection orifices at a downstream edge of the ramp over an entire width thereof in order to facilitate unloading and loading of the mat of sheets of material, wherein the air injection orifices are adjacent to the first and second rows of teeth and configured to limit a portion of the mat to be unloaded that is subjected to vacuum from suction in the conveyor.

13. The machine according to claim 12, wherein the one end of the machine is an unloading end and/or a loading end.

14. The machine according to claim 12, wherein some comb elements of the plurality of comb elements have different characteristics from the other comb elements of the plurality of comb elements.

* * * * *